United States Patent
Reiche

(10) Patent No.: US 8,270,536 B2
(45) Date of Patent: Sep. 18, 2012

(54) METHOD AND DEVICE FOR ADAPTING A THRESHOLD VALUE OF A DETECTION DEVICE

(75) Inventor: Martin Reiche, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 1405 days.

(21) Appl. No.: 11/053,083

(22) Filed: Feb. 7, 2005

(65) Prior Publication Data
US 2005/0180530 A1     Aug. 18, 2005

(30) Foreign Application Priority Data
Feb. 6, 2004 (DE) .......................... 10 2004 006 015

(51) Int. Cl.
*H04L 25/06* (2006.01)
(52) U.S. Cl. ......... 375/317; 375/295; 375/219; 375/346
(58) Field of Classification Search ................. 375/317, 375/219, 316
See application file for complete search history.

(56) References Cited

U.S. PATENT DOCUMENTS

| | | | | |
|---|---|---|---|---|
| 3,597,754 A * | 8/1971 | Lerner | ............................ | 367/95 |
| 3,680,088 A * | 7/1972 | Bryant et al. | ................. | 342/197 |
| 3,778,822 A * | 12/1973 | Bauer | ............................ | 342/93 |
| 3,783,379 A * | 1/1974 | Nestorovic | ................. | 324/103 P |
| 3,863,198 A * | 1/1975 | Lerner | ............................ | 367/91 |
| 4,036,057 A | 7/1977 | Morais | | |
| 4,270,208 A * | 5/1981 | MacDavid | .................... | 375/317 |
| 4,752,968 A * | 6/1988 | Lindenmeier et al. | ..... | 455/277.2 |
| 4,785,664 A | 11/1988 | Reebs | | |
| 4,806,843 A * | 2/1989 | Mertens et al. | ............... | 323/271 |
| 4,811,122 A * | 3/1989 | Kido et al. | ........................ | 360/25 |
| 5,091,729 A * | 2/1992 | Cantwell et al. | ................ | 342/90 |
| 5,323,361 A | 6/1994 | Elle et al. | | |
| 5,359,575 A * | 10/1994 | Williams et al. | ............... | 367/127 |
| 5,577,056 A * | 11/1996 | Malik et al. | .................... | 714/812 |
| 5,768,131 A * | 6/1998 | Lissel et al. | ................... | 701/301 |
| 5,870,022 A * | 2/1999 | Kuhnly et al. | ................ | 340/567 |
| 6,760,592 B2 * | 7/2004 | Hernandez et al. | ........ | 455/456.1 |
| 2003/0039171 A1 | 2/2003 | Chiapetta | | |

FOREIGN PATENT DOCUMENTS

| | | |
|---|---|---|
| DE | 39 37 585 | 5/1991 |
| DE | 42 08 595 | 5/1993 |
| DE | 196 45 339 | 5/1998 |
| WO | WO 02/48737 | 6/2002 |

* cited by examiner

*Primary Examiner* — Lihong Yu
(74) *Attorney, Agent, or Firm* — Kenyon & Kenyon LLP

(57) ABSTRACT

A method for adapting a threshold value of a detection device comprising the following steps: Transmission of a signal burst having a predefined pulse-repetition interval, a predefined burst length and a defined signal frequency; receiving and processing of a receive signal, in particular by means of amplification, filtering and demodulation, so as to obtain the envelope; determining a receive-signal magnitude as interference-level sample from the receive signal following a first predefined time duration ($\Delta t_1$) starting with a signal burst within a predefined second time duration ($\Delta t_2$), preferably at the end of the pulse repetition interval; and adapting the threshold value of the detection device as a function of the interference level sample. Also provided is a device for adapting a threshold value of a detection device.

22 Claims, 2 Drawing Sheets

METHOD AND DEVICE FOR ADAPTING A THRESHOLD VALUE OF A DETECTION DEVICE

FIELD OF THE INVENTION

The present invention relates to a method and a device for adapting a threshold value of a detection device and, in particular, to a method and a device for adapting a threshold value, on the basis of an ultrasonic system for detecting the surroundings of a vehicle.

BACKGROUND INFORMATION

There is increasing demand for detection devices, especially in the automotive sector. For detecting the surroundings of a vehicle, the use of ultrasonic systems is preferred.

From German Patent Application No. 196 45 339, an ultrasonic parking assistance system and a method for a distance measurement as a function of vehicle data in a motor vehicle are known. This system emits a warning signal if an echo signal that lies inside a time window establishing a measuring range exceeds a specific threshold value. According to the German laid-open document, a static threshold value characteristic curve having a predefined number of interpolation points is transmitted via a transmitter/receiver line from a control unit to a sensor, typically at the beginning of the parking operation. A static threshold may be configured under two aspects: First, one that is optimized with respect to a minimal false alarm by noise and interference sources, which goes hand in hand with a high threshold level and entails low sensitivity or range of the detection system as a function of the reflecting size of the object to be detected. Secondly, there is the possibility of providing high sensitivity of the system by setting the threshold close to the noise/clutter limit, which results in a system exit due to "phantom" obstacles by a temporarily occurring interference source or by temporary interference influences.

Clutter or ground clutter refers to reflections of an ultrasound signal due to gravel or crushed stones, for instance. As a consequence, the configuration of a static threshold value characteristic curve involves a compromise between the aspects of high sensitivity, if possible, and a still acceptable false alarm rate under worst-case ambient conditions. Noise is caused by electronic amplification of the reception of the transducer signal and determines the best-case sensitivity limit or the lowest possible threshold.

The use of an adaptive threshold on the basis of a binary, i.e., digital, analysis on the level of the control unit is not possible either, for two reasons: First of all, the track evaluations in the control unit and a dead time arising in the transmission are incompatible with the latency-time demands of expanded detection-system functions such as autonomous driveaway or detection in the region of the blind spot. On the other hand, the transmitted time-analog, binary-valued information from the sensor, i.e., the transmitter/receiver unit, to the control unit, includes only a radial obstacle or clutter distance, but no quantization of the magnitude or the amount of the clutter or noise level. No suitable adaptive threshold adaptation in the control unit is possible on this basis, since no differentiation criterion between a target object and clutter, i.e., interference reflections, is provided.

However, the expanded functions of the detection system should also be utilizable in a dynamic environment in which the acoustic interference level may change rapidly, for instance due to passing interferences such as two-stroke motorcycles, wind noise and/or so-called microphonics, which depend on the engine load or engine speed or other vehicle vibrations.

SUMMARY OF THE INVENTION

In contrast to the known design approach, the method for adapting a threshold value of a detection device according to the present invention and the device according to the present invention have the advantage of providing an adaptive threshold control in which the system varies the detection threshold as a function of external conditions. This allows a differentiation between an obstacle and interference signals, so that both a minimal false alarm, caused by interference sources, and high sensitivity of the system are able to be ensured.

In essence, the present invention is based on the idea of implementing an interference-level measurement during a time interval in which no reflected measuring signal is expected. This allows an adaptive threshold regulation whose detection threshold or actuating variable is detected within a time range—preferably at the end of a measuring cycle—during which no reflected useful signal with a correspondingly high signal level occurs. This makes use of the characteristic that most external interferences (wind noise, passing motor vehicles, microphonics) occur at a constant level across the entire measuring cycle, whereas useful signals from target objects become miniscule at the end of a measuring cycle due to the object distance related to the propagation delay and the attendant distance attenuation, which increases quadratically.

Furthermore, useful signals from reflecting objects have the characteristic of a peak on a demodulated receive signal whose characteristic width is a function of the width of the transmission burst. In contrast, the profile of the interference level is virtually constant. Useful target and constant interferences are thus differentiable on the basis of their time constant.

In other words, a method for adapting a threshold value of a detection device is provided, which encompasses the following steps: Transmitting a signal burst with a predefined pulse-repetition interval, a predefined burst length and a defined signal frequency; receiving and processing a receive signal, in particular by means of amplification, filtering and demodulation, so as to obtain the envelope; determining a receive-signal magnitude from the receive signal as interference-level sample following a first predefined time interval, starting with a signal burst, within a predefined second time duration, preferably at the end of the pulse repetition interval; and adapting a threshold value of the detection device as a function of the interference level sample.

According to a preferred further development, the interference level sample is ascertained from the envelope of the time-windowed receive signal at the end of the pulse-repetition interval by means of a peak-value rectifier, the peak-value rectifier preferably having a hold-time constant that is greater than the pulse-repetition interval PRI. Use of a peak-value rectifier advantageously allows the maximum of the envelope of the time-windowed receive signal to be ascertained and stored for a predefined time in a simple manner. By selecting an appropriate hold-time constant it is possible to maintain the maximum receive-signal level of the noise or interference level sample, ascertained according to the present invention, across the measuring cycle in a largely constant manner for a predetermined time. This hold-time constant of the peak-value rectifier determines the reactivity of the adaptation in response to temporally changing ambient conditions.

According to another preferred further development, the peak-value rectifier is configured such that its load-time constant exceeds the burst length, preferably that its hold-time constant is longer than the pulse-repetition rate and, in particular, that the temporal acquisition duration of the interference level samples is longer than the load-time constant. As a result, the noise-sample determination is unable to simulate the profile of a useful signal, i.e., a receive peak caused by an object reflection, or it may simulate it to a limited extent only. In contrast, the load-time constant is small relative to the time characteristic of the dynamics of the interference level (for instance, as a function of interference sources driving past) and is easily able to follow it within the selected time-window of the noise sample. It therefore results that the length of the time window of the noise sample must be greater than the load-time constant so that the peak-value rectifier is able to recharge to the maximum of the magnitude of the receive-signal envelope within this interval.

According to another preferred further development, a timer stipulates the first predefined time duration, preferably 35 ms to 55 ms, which is triggered by the predefined clock pulse, preferably at a pulse frequency of 15 Hz to 30 Hz. This has the advantage that the timer component, which is preferably triggered by a transmit request, releases the input of a detection device, preferably the peak-value rectifier, after a predefined period following the transmit trigger, i.e., following the transmission of a signal pulse, so as to detect the receive-signal maximum, and then locks it again by a subsequent transmit trigger. In a simple and cost-effective manner, the timer may preferably be realized by a monoflop.

According to another preferred further development, a predefined threshold value is added to the ascertained noise sample, the predefined threshold value preferably having the time characteristic of a VZ1 element and/or programmed interpolation points within the meaning of a static characteristic curve. This advantageously provides a dynamic output-threshold value, which includes both a static and a dynamic component as a function of the receive-signal magnitude. The static portion is used to intercept the magnification of the interference level caused by ground clutter, which occurs in a localized and thus time-dependent manner depending on the sensor installation height and angle of incidence, in a typical distance range of 1 to 2 m, or within a time window of approximately 6 to 12 ms.

According to another preferred further development, the receive signal, having been amplified first, is filtered by a bandpass filter, preferably with a mid-frequency on the resonant frequency or transmit frequency of a transducer and with a pass-bandwidth that is proportional to the inverse value of burst length $\Delta t_1$, and the envelope is demodulated, especially by means of a double-way rectifier and a low-pass filter, prior to the noise sample being ascertained therefrom. The threshold ascertained from the dynamic and static portion is preferably also applied to this envelope. This advantageously provides an easily implementable and effectively working signal processing in the detection device, thereby circumventing the necessity of a mirror-inverted threshold to be applied to the bipolar receive signal with carrier.

According to another preferred further development, signal processing is implemented by an I/Q demodulation, cross-correlation of an I and Q channel with an ideal time-shifted and, in particular, also Doppler-shifted replica of the transmit signal, and the amount is formed from the sum of the squares of the cross-correlations of the I and Q channel, the amount being scaled with the auto-correlation of the replica. This scaled amount, as output signal of the optimal receiver, corresponds to the output of the low pass after the double-pass rectifier in the above simple realization.

According to another preferred further development, the transmit/receive device includes a transducer for emitting signal pulses at a signal frequency of between 40 KHz and 100 KHz, preferably with a pulse length of 150 μs to 500 μs, and, in particular, a pulse-repetition rate of 10 Hz to 30 Hz, and for receiving an analog acoustic receive signal. This advantageously provides an ultrasound-based system having adaptive threshold adjustment, which may be used in the automotive sector, in particular.

According to another preferred further development, an addition device for adding the receive-signal magnitude, as interference level sample, to a predefined threshold value, which preferably has a predefined time characteristic that is, in particular, acted upon by the pulse-repetition rate, to form a resulting dynamic threshold value.

According to another preferred further development, a comparator is provided to generate a binary-valued detection signal by comparing the demodulated receive signal to the dynamic threshold value. This has the advantage of realizing a detection device having a dynamic detection threshold value, which is able to be implemented in a cost-effective manner, a binary value (obstacle present or no obstacle present) being output in a time-analog manner.

DETAILED DESCRIPTION

Figure 1:
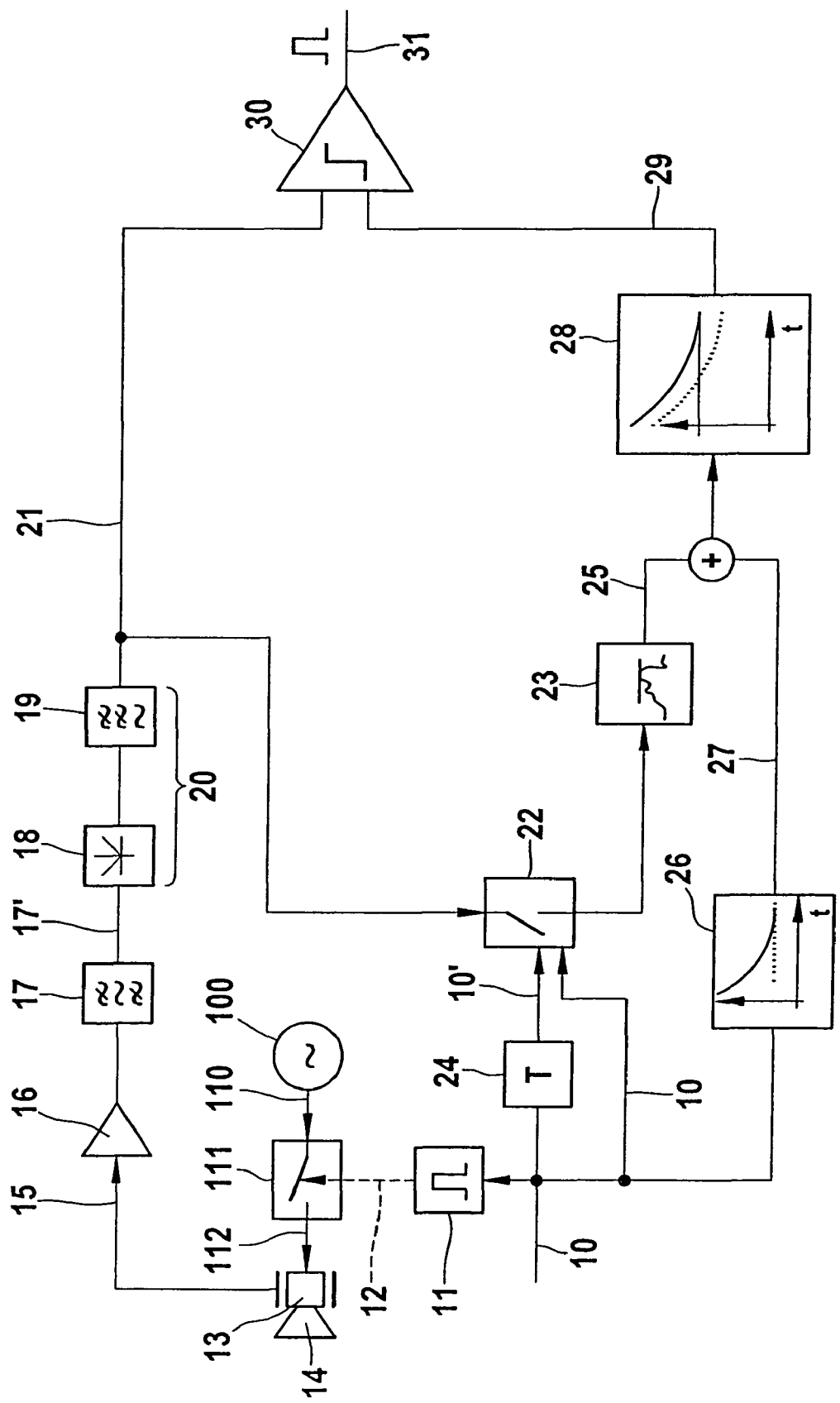
FIG. 1 shows a schematic block diagram of a detection device having an adaptive detection threshold value, to elucidate a specific embodiment of the present invention.

In the figures, identical numerals denote the same or functionally equivalent component parts. FIG. 1 schematically shows a block diagram in which a pulse-repetition clock 10 (pulse repetition interval PRI) is transmitted to a signal-modification device 11. Signal-modification device 11 modifies, in particular, the signal form and the signal duration, preferably into a square-wave pulse having a width $\Delta t$ of between 100 μs and 1 ms, in particular, 300 μs. Signal-modification device 11, especially a pulse shaper, determines $\Delta t$ and, according to an alternative exemplary embodiment, may realize another pulse shape as envelope, for instance a Gauss function $Q(t) = \exp(-\pi(t/\Delta t)^2)$, instead of a square-wave pulse.

Signal-modification device 11 routes carrier signal 110 from a transmit generator 100 via a switching device 111 or, in the case of the alternative exemplary embodiment, via an AM modulator 111'. Transmit generator 100 is operated at a predefined frequency, preferably in a range between 40 KHz and 100 KHz, in particular approximately 50 KHz. Switching device 111 or AM modulator 111', triggered by signal-modification device 11, triggers a transmit/receive device 13, preferably an acoustic transducer, in transmit mode via a signal pulse 112 to be transmitted. Clock pulse 10 has a pulse-repetition rate, or a pulse repetition interval (PRI), of between 35 ms and 60 ms, preferably approximately 50 ms. Transmit or receive device 13, triggered by signal pulse 112, outputs a transmit signal 14 at the predefined frequency, which has a corresponding envelope according to the alternative exemplary embodiment.

At the same time, transmit/receive device 13 receives a receive signal 15, which is preferably transmitted to an amplification device 16. The amplification of analog receive signal 15 in amplification device 16 is followed by filtering with the aid of a filter device 17, preferably a bandpass filter, which, in particular, includes a mid-frequency that corresponds to the signal frequency of transmit pulse 14 and, in particular, has a pass bandwidth that is proportional to the inverse value of burst length $1/\Delta t$. Appropriately filtered receive signal 17' is then supplied to a double-way rectifier 18 having integrated low pass 19. Filtered receive signal 17' is preferably demodulated with respect to its amplitude in this non-coherent demodulation device 20, which is made up of double-way rectifier 18 and lowpass filter 19. In this way, filtered receive signal 17' becomes a demodulated receive signal 21, which corresponds to the envelope of filtered receive signal 17', i.e., the carrier signal. In double-way rectifier 18 a signal having only positive half waves is obtained, the low-pass filtering in low pass filter 19 filtering out high-frequency spectrums.

Via a switching device 22, preferably a field effect transistor, demodulated receive signal 21 is then sent to an amplitude detection device 23, preferably a peak-value rectifier. Switching device 22 is triggered by clock pulse 10, which, however, implements a delay having a predefined time duration, for instance, 45 ms, via a timer 24 such as a dead time element, in particular. The switching device thereupon switches demodulated receive signal 21 through to amplitude detection device 23 in accordance with delayed clock pulse 10', until next non-delayed clock pulse 10, as reset, opens switching device 22 again. In this way a receive-signal magnitude is identified by amplitude detection device 23, preferably by the peak-value rectifier, during a second predefined time interval following a first predefined time interval after a clock pulse, preferably by the time the following clock pulse occurs.

For the purposes of an optimal receiver, signal processing may also be carried out in a more involved fashion.

To this end, the following processing steps are conceivable, which may be realized both in hardware and in software provided receive signal 15 is sampled sufficiently:
 a) I/Q demodulation;
 b) cross correlation of the I and Q channel by means of ideal time-shifted and possibly also Doppler-shifted replica of the transmit signal;
 c) amount formation from the sum of the squares of the cross correlation of the I and Q channel;
 d) scaling of the amount with the auto correlation of the replica.

This scaled amount, as output signal of the optimal receiver, corresponds to output signal 21 of the low pass after double-way rectifier 18 in the above simple realization.

If an ultrasound ambient environment detection device is assumed and given a sound velocity in air of approximately 330 m/s, a delay of 45 ms, for instance, effected by timer 24, has the result that amplitude detection device 23 detects the maximal signal level of a signal sample in the distance range of approximately 7.7 to 8.5 m. If one assumes that this amplitude value which occurs in this predefined time window is caused by an interference source and has not been generated by a transmit pulse reflected at an obstacle, it is possible to derive an adaptive detection threshold as interference level sample 25 from this receive-signal magnitude.

The sonic field intensity of a reflected transmitted pulse is generally not sufficient to generate a clearly detectable receive signal for typical obstacles or targets having distances of >7 m. If required, it is also possible to lower the repetition rate of clock pulse 10 from 20 Hz to 16 Hz, for instance, and to correspondingly increase the time delay by timer 24, from 45 ms to 55 ms, for example, which further delays the noise sample and would mean a correspondingly greater distance range. Furthermore, the selection of the load-time constant ensures that useful signals from object reflections will contribute only negligibly to the loading of the peak value, i.e., interference level.

Amplitude detection device 23, preferably the peak-value rectifier, has a time constant that amounts to 240 ms, in particular, and thus is nearly five times higher than pulse repetition rate 10, i.e., the clock pulse, thereby keeping the receive signal magnitude, as interference level sample 25, i.e., the maximum noise sample level, largely constant across the measuring cycle following the opening of switching device 22. This time constant of amplitude detection device 23 determines the reactivity of the adaptation to dynamically changing ambient noises, for instance. Peak-value rectifier 23 is configured such, in particular, that its load-time constant $t_{charge}$ exceeds burst length $\Delta t$, it being preferred that its hold-time constant $t_{hold}$ be longer than pulse-repetition rate PRI, and, in particular, that the temporal acquisition duration of the interference level sample $T_{sample}$ be longer than load-time constant $t_{charge}$. Consequently, the noise-sample determination is unable to simulate the characteristic of a useful signal, i.e., a receive peak caused by an object reflection, or it is able to simulate it to a limited extent only. However, load-time constant $t_{charge}$ is small relative to the time characteristic of the dynamics of the interference level (for instance as a function of interference sources driving by) and is easily able to follow it within selected time-window $t_{sample}$ of the noise sample. It thus follows that the length of time window $T_{sample}$ of the noise sample must be greater than load-time constant $t_{charge}$ in order to ensure that peak-value rectifier 23, within this interval, is able to recharge to the maximum of the magnitude of the receive-signal envelope ($t_{hold}$>PRI, $t_{charge}$>$\Delta t$, $T_{sample}$>$t_{charge}$). A configuration example is: PRI=50 ms, $\Delta t$=300 µs, $t_{charge}$=5 ms, $t_{hold}$=300 ms, $T_{sample}$=8 ms (between 42 . . . 50 ms after transmission of a burst in each case).

Clock pulse 10 also goes to a static threshold-value generation device 26 and triggers it. In a simple realization, static threshold-value generation device 26 preferably has the time characteristic of a VZ1 element, which is activated at each trigger or clock pulse. Furthermore, as an alternative to the time characteristic of the VZ1 delay element, it is possible, for instance, to predefine a particular time characteristic of the static threshold via programmed interpolation points. Noise sample 25 is added to a static threshold value 27 via an addition element +. This results in a static threshold value 27, raised by the receive-signal magnitude as interference level sample 25, which is illustrated in block 28 according to FIG. 1.

Demodulated receive signal 21 and an adaptive threshold value 29, obtained from adding static threshold 27 and interference level sample 25, will then be compared in a comparator 30 as comparison device. The comparison by comparator 30 yields a binary, i.e., digital, detection signal 31, which has a high level if demodulated receive signal 21 has a level that is above adaptive threshold value 29. Dynamic threshold 29, which determines the offset of the receive-signal amplitude as interference level sample 25 as a function of the noise sample supplied via switching device 22, thus allows the sensitivity of the detection device to be adapted as a function of occurring interference sources or interference variables. The receive-signal magnitude as interference level sample 25 is preferably raised by a level of 10 dB by multiplication by a fixed value. This corresponds to a false alarm rate of approximately 4.5E-5 in the case of white noise.

Figure 2A:
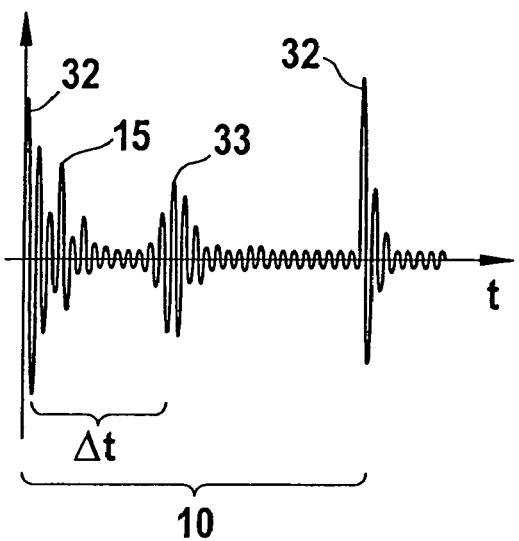
FIG. 2a is a first individual schematic signal diagram over time t after various signal-processing steps.

FIG. 2a, by way of example, shows a receive signal 15, received from transmit/receive device 13, over time t. An amplitude maximum in the region of the ordinate, which is generated by the transmission burst or signal pulse 12, is attenuated exponentially, whereupon, according to FIG. 2a, an amplitude rise occurs in the middle range between the two signal pulses 32, which is caused by a reflected signal pulse 33. The image is repeated in accordance with clock pulse 10. Time duration $\Delta t_1$ between the appearance of transmitted signal pulse 32 and received signal pulse 33 as time duration, when multiplied by the sonic velocity in air, results in the distance to an obstacle.

Figure 2B:
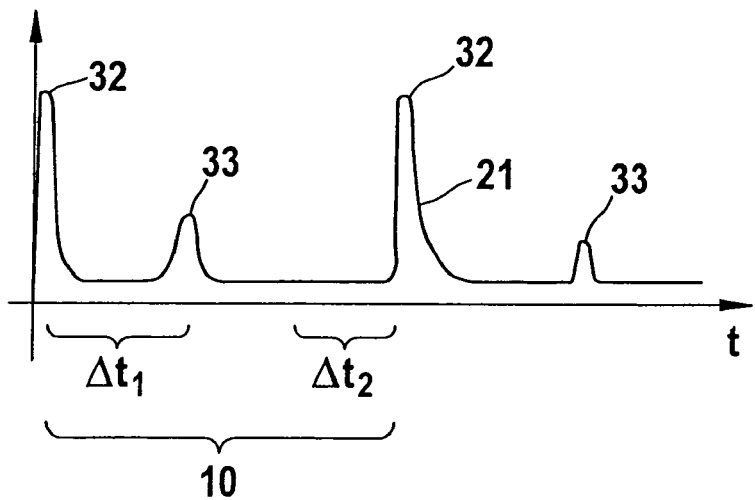
FIG. 2b is a second individual schematic signal diagram over time t after various signal-processing steps.
Figure 2C:
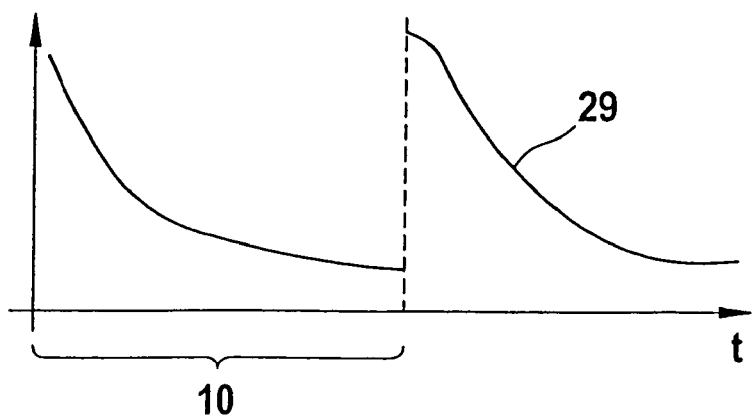
FIG. 2c is a third individual schematic signal diagram over time t after various signal-processing steps.

FIG. 2b shows demodulated receive signal 21 according to FIG. 1. When compared to FIG. 2a, it becomes clear that receive signal 15 is filtered and provided only with positive signal values in signal-processing device 16, 17, 18 and 19 according to FIG. 1. During time period $\Delta t_2$, switching device 22 according to FIG. 1 is switched through, and amplitude-detection device 23 acquires an interference-level sample 25. FIG. 2c schematically illustrates a corresponding dynamic threshold 29 according to FIG. 1.

Although the method according to the present invention is described on the basis of a preferred exemplary embodiment, it is not limited thereto, but is able to be modified in a plurality of ways. For instance, in addition to ultrasonic detection devices, other detection devices such as in the radar spectrum may also be provided with a dynamic threshold value according to the present invention. The mentioned time durations or frequency values should therefore be considered examples only and may also be in the ns-range or GHz range, for instance. Although described with reference to a surroundings detection of a vehicle, in particular a motor vehicle, the present invention is applicable to any other detection device.

What is claimed is:

1. A method for adapting a threshold value of a detection device, comprising:
    transmitting a signal burst at a predefined pulse-repetition interval, a defined burst length, and a defined signal frequency;
    receiving and processing a receive signal to obtain an envelope;
    ascertaining a magnitude of the receive-signal as an interference-level sample from the envelope of the receive signal after a first predefined time duration beginning with the signal burst, and within a predefined second time duration prior to a next signal burst;
    generating a dynamic threshold value by summing the interference-level sample with a static threshold value having a predefined time characteristic;
    comparing the envelope of the receive signal to the dynamic threshold value; and
    generating an output indicating that an object has been detected when the envelope exceeds the dynamic threshold value.

2. The method as recited in claim 1, wherein:
    the receive signal is amplified, filtered, and demodulated to obtain the envelope.

3. The method as recited in claim 1, wherein:
    the ascertaining is performed at an end of the pulse-repetition interval.

4. The method as recited in claim 1, wherein:
    the ascertaining is performed from an envelope of the receive signal by a peak-value rectifier, the peak-value rectifier including a hold-time constant that is greater than the pulse-repetition interval.

5. The method as recited in claim 4, further comprising:
    configuring the peak-value rectifier so that a load-time constant thereof exceeds the defined burst length, so that a hold-time constant thereof is longer than the pulse-repetition interval, and so that a temporal acquisition duration of the interference-level sample is longer than the load-time constant.

6. The method as recited in claim 1, wherein a timer stipulates the first predefined time duration at 35 ms to 55 ms, and wherein the timer is triggered at the predefined pulse-repetition interval, at a clock frequency of 15 Hz to 30 Hz.

7. The method as recited in claim 1, wherein the static threshold value corresponds to programmed interpolation points within a static characteristics curve.

8. The method as recited in claim 1, wherein, for the purpose of an optimal receiver, a signal processing including an I/Q demodulation and a cross-correlation of an I and a Q channels using; an ideal time-shifted and a Doppler-shifted replica of a transmit signal is implemented, and wherein an amount is formed from a sum of squares of the cross-correlation of the I and Q channels, the amount being scaled by an auto-correlation of the replica.

9. The method as recited in claim 1, further comprising:
    amplifying the receive signal;
    filtering the receive signal by a bandpass filter with a mid-frequency on one of a resonant frequency and a transmit frequency of a transducer and with a pass-bandwidth that is proportional to an inverse value of the burst length;
    demodulating the envelope by a double-way rectifier and a low-pass filter, before the interference-level sample is ascertained therefrom.

10. The method as recited in claim 1, wherein:
    the ascertaining of the interference-level sample is performed during a time interval in which no reflected measuring signal from a target object occurs.

11. The method of claim 1,
    wherein the ascertaining of the interference-level sample is performed only during a time interval in which no reflected measuring signal from a target object occurs.

12. A device for adapting a threshold of a detection device, comprising:
    a transmit/receive device for transmitting a transmit burst at a predefined pulse-repetition rate and a predefined signal frequency, and for receiving a receive signal;
    a signal-processing device for processing the receive signal;
    a detection device for ascertaining a receive-signal magnitude as a noise-level sample from an envelope of the receive signal after a first predefined time duration starting with the transmit burst and within a predefined second time duration prior to a next transmit burst;
    a threshold generation device generating a static threshold value having a predefined time characteristic;
    a summing device generating a dynamic threshold value by summing the noise-level sample with the static threshold value; and
    a comparator that compares the envelope of the receive signal to the dynamic threshold value and generates an output indicating that an object has been detected when the envelope exceeds the dynamic threshold value.

13. The device as recited in claim 12, wherein:
    the device is incorporated in an ultrasonic system for detecting surroundings of a vehicle.

14. The device as recited in claim 12, wherein the transmit/receive device includes a transducer for emitting the transmit burst having a signal frequency between 40 KHz and 100 KHz and for receiving an analog acoustical receive signal.

15. The device as recited in claim 14, wherein the transmit burst has a pulse length of 150 μs to 500 μs and a pulse-repetition rate of 10 Hz to 30 Hz.

16. The device as recited in claim 12, wherein the detection device has a peak-value rectifier for ascertaining the receive-signal magnitude as a function of a release by a timer.

17. The device as recited in claim 12, wherein the signal-processing device includes at least an amplifier, a band-pass filter device, a demodulation device, a two-way rectifier, and a low-pass filter, to produce a demodulated receive signal.

18. The device as recited in claim 17, wherein the static threshold value is output by the threshold generation device in response to a clock pulse.

19. The device as recited in claim 18, further comprising:
a comparator for generating a digital detection signal by comparing the demodulated receive signal to the dynamic threshold value.

20. The device of claim 12,
wherein the detection device performs the ascertaining of the noise-level sample only during a time interval in which no reflected measuring signal from a target object occurs.

21. A method, comprising:
transmitting an ultrasound signal at a predefined pulse-repetition interval, a predefined burst length, and a predefined signal frequency;
receiving a reflected signal;
processing the reflected signal to generate an envelope of the reflected signal;
sampling the envelope at a predefined time after each ultrasound signal transmission;
during a time interval in which no useful signals corresponding to an object to be detected contribute to the reflected signal, applying an amplitude detection procedure to the sampled envelope, thereby generating an interference signal;
generating a dynamic threshold by summing the interference signal with a static threshold value having a predefined time characteristic;
comparing the envelope to the dynamic threshold; and
generating an output indicating that an object has been detected when the envelope exceeds the dynamic threshold.

22. The method of claim 21, wherein the amplitude detection procedure is performed using a peak-value rectifier in which a hold-time constant is longer than the pulse-repetition interval, a load-time constant is longer than the burst length, and a temporal-acquisition duration is longer than the load-time constant.

* * * * *